United States Patent
Mizuno

[11] Patent Number: 5,950,594
[45] Date of Patent: Sep. 14, 1999

[54] APPARATUS FOR CONTROLLING FUEL INJECTION IN STRATIFIED CHARGE COMBUSTION ENGINE

[75] Inventor: Hiroyuki Mizuno, Toyota, Japan

[73] Assignee: Toyota Jidosha Kabushiki Kaisha, Toyota, Japan

[21] Appl. No.: 08/929,120

[22] Filed: Sep. 15, 1997

[30] Foreign Application Priority Data

Sep. 17, 1996 [JP] Japan ................................. 8-244595
Sep. 4, 1997 [JP] Japan ................................. 9-239472

[51] Int. Cl.[6] .................................................. F02B 17/00
[52] U.S. Cl. .......................................... 123/295; 123/377
[58] Field of Search .................................. 477/205, 206, 477/202, 203; 123/295, 377, 198 D

[56] References Cited

U.S. PATENT DOCUMENTS

| | | |
|---|---|---|
| 2,876,876 | 3/1959 | Cummins . |
| 3,799,303 | 3/1974 | Stoltman ............................. 123/377 |
| 3,947,073 | 3/1976 | Cattaneo et al. . |
| 4,192,278 | 3/1980 | Iizaka et al. ....................... 123/198 F |
| 4,610,483 | 9/1986 | Matsumoto et al. . |
| 5,152,587 | 10/1992 | Volz . |
| 5,826,559 | 10/1998 | Ichimoto et al. . |
| 5,846,164 | 12/1998 | Harada . |

FOREIGN PATENT DOCUMENTS

| | | |
|---|---|---|
| A-147 740 | 7/1985 | European Pat. Off. . |
| 1231337 | 9/1960 | France . |
| A-32 38 882 | 4/1984 | Germany . |
| A-58-23244 | 2/1983 | Japan . |
| A-5-213182 | 8/1993 | Japan . |
| A-8-164840 | 6/1996 | Japan . |
| 308680 | 5/1930 | United Kingdom . |

*Primary Examiner*—Erick R. Solis
*Attorney, Agent, or Firm*—Oliff & Berridge, PLC

[57] ABSTRACT

An improved apparatus for controlling fuel injection in an internal combustion engine is disclosed. The engine performs stratified charge combustion. A throttle valve causes negative pressure to be produced in the intake duct. A brake booster is operated by the negative pressure in the intake duct to increase the braking force. When the value of the negative pressure applied to the brake booster is inadequate, an ECU decreases the opening of the throttle valve to increase the negative pressure in the intake duct. The ECU controls the injection valve to increase amount of fuel injected from the injection valve in accordance with the decrease of the opening of the throttle valve for maintaining the engine speed.

19 Claims, 9 Drawing Sheets

APPARATUS FOR CONTROLLING FUEL INJECTION IN STRATIFIED CHARGE COMBUSTION ENGINE

BACKGROUND OF THE INVENTION

The present invention relates to an apparatus for controlling the fuel injection in engines that are able to perform stratified charge combustion. More particularly, the present invention pertains to an apparatus for controlling the fuel injection in stratified combustion engines that are provided with brake boosters, which use negative pressure to improve braking force.

In a typical engine, fuel is injected into an intake port from a fuel injection valve to charge a mixture of fuel and air to the associated combustion chamber in a uniform manner. An intake passage is opened and closed by a throttle valve, which is operated by manipulating an acceleration pedal. The opening of the throttle valve adjusts the intake air amount (and ultimately the amount of uniform mixed air and fuel) that is supplied to the combustion chambers of the engine. This controls engine power.

However, when performing uniform charge combustion, much negative pressure is produced by the throttling action of the throttle valve. This increases pumping loss, which is generated when the mixture is drawn into the combustion chamber from the intake port. To attempt to solve this problem, stratified charge combustion has been proposed. In stratified charge combustion, the throttle valve is opened wide, and fuel is supplied directly into each combustion chamber. This provides a mixture having a relatively low air-fuel ratio in the vicinity of the ignition plug. As a result, ignitability is enhanced.

Japanese Unexamined Patent Application No. 8-164840 describes an engine that performs stratified charge combustion. In this engine, each combustion chamber is provided with a uniform charge fuel injection valve and a stratified charge fuel injection valve. The uniform charge injection valve uniformly disperses fuel into the combustion chamber and the stratified charge injection valve injects fuel toward the vicinity of the ignition plug. When the engine load is small, fuel is injected from the stratified charge injection valve. Thus, the fuel is supplied in a concentrated manner about the ignition plug. The throttle valve is almost fully opened to perform stratified charge combustion. This improves fuel efficiency and decreases pumping loss.

This engine is also provided with a brake booster that increases the braking force thereby decreasing the required force for depressing of the brake pedal. The brake booster uses negative pressure, which is produced in the intake passage downstream of the throttle valve, as a drive source. In other words, negative pressure is communicated to the brake booster through a communicating pipe connected to the downstream side of the throttle valve. Negative pressure, which corresponds to the degree of depression of the brake pedal, acts on a diaphragm, which is incorporated in the brake booster, and increases the force actuating the brake.

However, in such an engine, pressure in the intake passage is increased during stratified charge combustion. That is, there is less vacuum pressure available. This may cause the negative pressure that actuates the brake booster to be insufficient. Accordingly, in the engine described in the above publication, the throttle valve is closed when the negative pressure that actuates the brake booster becomes insufficient. This guarantees the necessary negative pressure.

However, closing the throttle valve, for example, when the engine is idling, increases pumping loss and lowers the idling speed.

One of the ways to bring the lowered idle speed back to a target speed is to feedback control the amount of fuel injection, that is, to increase the fuel injection amount in accordance with the decrease of the idle speed. This feedback control, however, may have a response delay. For example, a delay in closing the throttle valve for producing necessary negative pressure for the brake booster quicken the pumping loss. In this case, the above described feedback control is too slow, and the engine speed is inevitably lowered and becomes unstable. If the engine speed is significantly lowered, the engine will stall.

The above described feedback control results in a lowered engine speed and reduced engine power not only when the engine is idling, but also when the vehicle is moving at a normal speed.

SUMMARY OF THE INVENTION

Accordingly, it is an objective of the present invention to provide an apparatus for controlling the fuel injection in a stratified combustion engine, which stabilizes the running state of the engine without disturbing the operation of a brake booster.

To achieve the above objective, the present invention discloses an apparatus for controlling fuel injection in an internal combustion engine that is able to perform stratified charge combustion. The air-fuel ratio varies within a combustion chamber during stratified charge combustion. Injection means injects fuel into the combustion chamber to perform the stratified charge combustion. An intake passage is connected to the combustion chamber for supplying air to the combustion chamber. Negative pressure producing means lowers the pressure in the intake passage. A brake booster is operated by pressure applied thereto from the intake passage to increase a braking force. Sensing means senses the value of the pressure applied to the brake booster. First control means controls the negative pressure producing means to lower the pressure in the intake passage when the value of the pressure sensed by the sensing means is above a predetermined value, which represents a pressure required to properly operate the brake booster. Second control means controls the injection means to increase amount of fuel injected from the injection means in accordance with the operation of the negative pressure producing means for suppressing a decrease in the engine speed when the pressure in the intake passage is lowered by the first control means.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

One embodiment of an apparatus for controlling fuel injection in a stratified charge combustion engine according to the present invention will now be described with reference to FIGS. 1 to 7.

Figure 1:
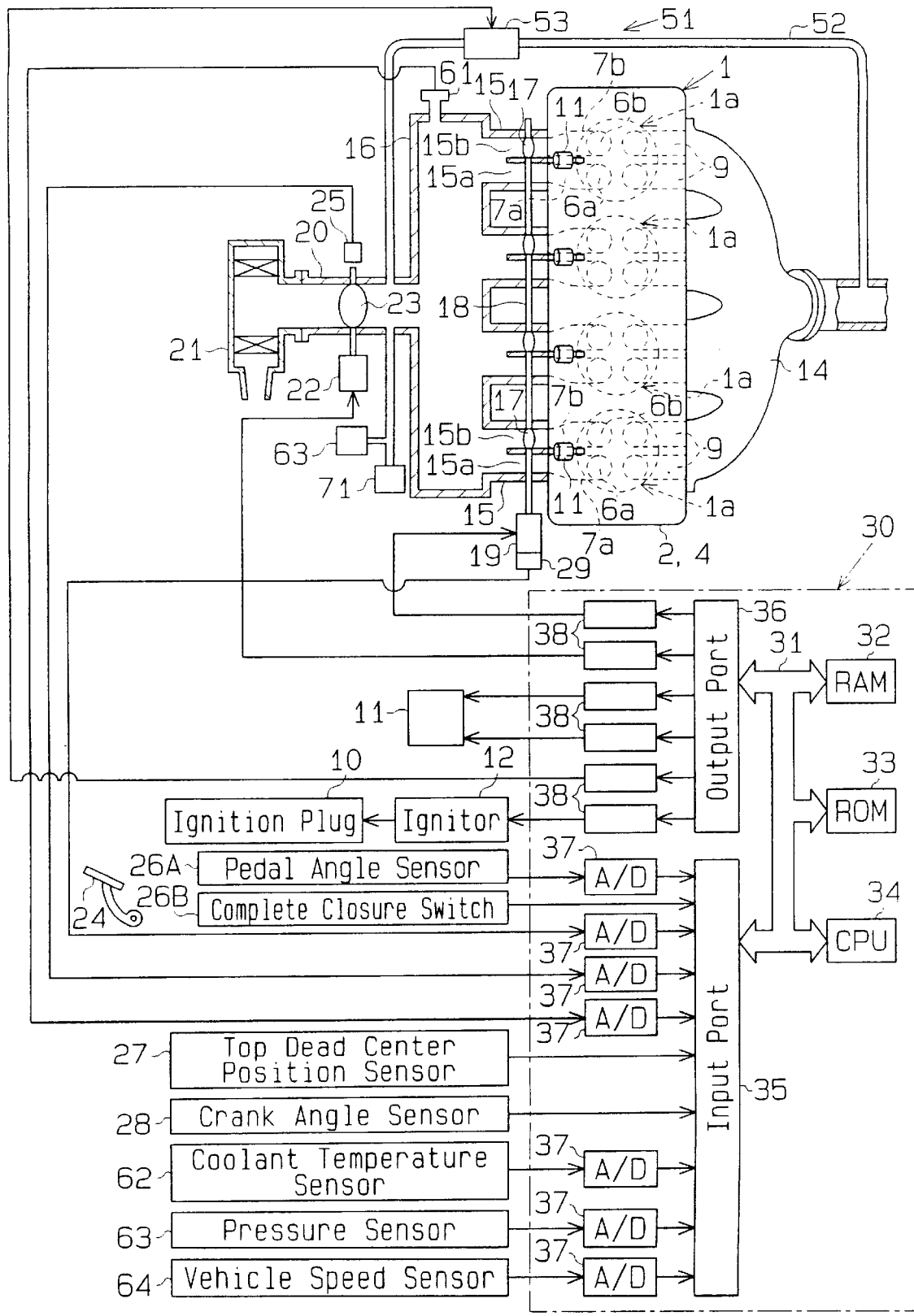
FIG. 1 is a diagrammatic view showing an apparatus for controlling the fuel injection of a stratified charge combustion engine according to a first embodiment of the present invention.
Figure 2:
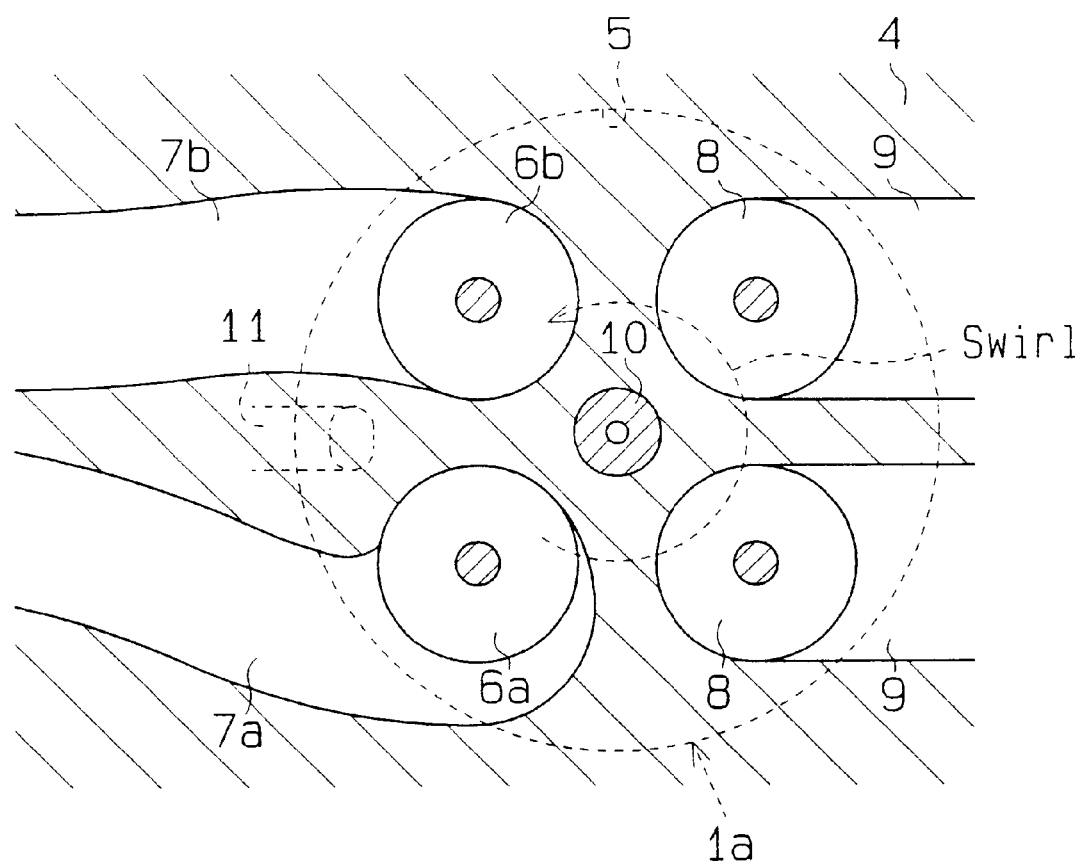
FIG. 2 is an enlarged diagrammatic cross-sectional view showing an cylinder of the engine of FIG. 1.

FIG. 1 illustrates an apparatus for controlling fuel injection in a cylinder injection type engine employed in a vehicle. As shown in FIG. 1, an engine 1 is provided with four cylinders 1a. The structure of the combustion chamber of each cylinder 1a is shown in FIG. 2. The engine 1 has a cylinder block 2 that accommodates pistons. The pistons are reciprocated in the cylinders 1a of the cylinder block 2. A cylinder head 4 is arranged on top of the cylinder block 2. A combustion chamber 5 is defined between each piston and the cylinder head 4. Four valves are provided for each cylinder 1a. The four valves include a first intake valve 6a, a second intake valve 6b, and two exhaust valves 8. The first intake valve 6a is provided with a first intake port 7a while the second intake valve 6b is provided with a second intake port 7b. Each exhaust valve 8 is provided with an exhaust port 9.

As shown in FIG. 2, the first intake port 7a is a helical port that extends in a helical manner. The second port 7b extends in a straight manner. Ignition plugs 10 are arranged at the middle of the cylinder head 4 to face the combustion chambers 5. High voltage is applied to each ignition plug 10 by an ignitor 12 though a distributor (not shown). The ignition timing of the ignition plugs 10 is determined by the output timing of the high voltage sent from the ignitor 12. A fuel injection valve 11 is arranged near the inner wall of the cylinder head 4 in the vicinity of each set of first and second intake valves 6a, 6b in each combustion chamber 5. The fuel injection valve 11 injects fuel directly into the associated combustion chamber 5 of cylinder 1a.

In this embodiment, each injection valve 11 directly injects fuel into the associated cylinder 1a when either stratified charge combustion or uniform charge combustion is performed. When stratified charge combustion is performed, the valve 11 injects fuel into the combustion chamber 5 at the final stage of each compression stroke. The injected fuel is supplied in a concentrated manner about the ignition plug 10 and burned. At this time, a throttle valve 23, which will be discussed below, is fully open. When uniform charge combustion is performed, on the other hand, the valve 11 injects fuel into the combustion chamber 5 during the intake stroke of the associated piston. The injected fuel is mixed with air introduced into the combustion chamber 5 from the intake ports 7a, 7b and is burned.

As shown in FIG. 1, the first and second intake ports 7a, 7b of each cylinder 1a are connected to a surge tank 16 by a first intake passage 15a and a second intake passage 15b, which are defined in an intake manifold 15. A swirl control valve 17 is arranged in each second intake passage 15b. The swirl control valves 17 are connected to, for example, a step motor (or a DC motor) 19 by a common shaft 18. The step motor 19 is controlled by signals sent from an electronic control unit (ECU) 30, which will be discussed later. The step motor 19 may be replaced with an actuating member controlled by the negative pressure in the intake ports 7a, 7b.

The surge tank 16 is connected to an air cleaner 21 through an intake duct 20. A throttle valve 23, which is opened and closed by a step motor (or a DC motor) 22, is arranged in the intake duct 20. The throttle valve 23 serves as negative pressure producing means. The ECU 30 sends signals to drive the step motor 22 for opening and closing the throttle valve 23. The throttle valve 23 adjusts the amount of intake air that passes through the intake duct 20 and enters the combustion chambers 5. In this embodiment, the intake duct 20, the surge tank 16, the first intake passage 15a and the second intake pipe 15b constitute an intake path. A throttle sensor 25 is arranged in the vicinity of the throttle valve 23 to detect the opening angle (throttle angle TA) of the valve 23.

The exhaust ports 9 of each cylinder 1a are connected to an exhaust manifold 14. After combustion, the exhaust gas is sent to an exhaust pipe (not shown) through the exhaust manifold 14.

The engine 1 is provided with a conventional exhaust gas recirculation (EGR) mechanism 51 that includes an EGR passage 52 and an EGR valve 53 arranged in the EGR passage 52. The EGR passage 52 communicates a part of the intake duct 20 at the downstream side of the throttle valve 23 with an exhaust duct connected to the exhaust manifold 14. The EGR valve 53 includes a valve seat, a valve body, and a step motor (all of which are not shown). The opening area of the EGR valve 53 is altered by causing the step motor to intermittently displace the valve body with respect to the valve seat. When the EGR valve 53 opens, some of the exhaust gas sent into the exhaust duct enters the EGR passage 52. The gas is then drawn into the intake duct 20 via the EGR valve 53. In other words, some of the exhaust gas is recirculated by the EGR mechanism 51 and returned to the air-fuel mixture. The EGR valve 53 controls the recirculation amount of the exhaust gas.

Figure 3:
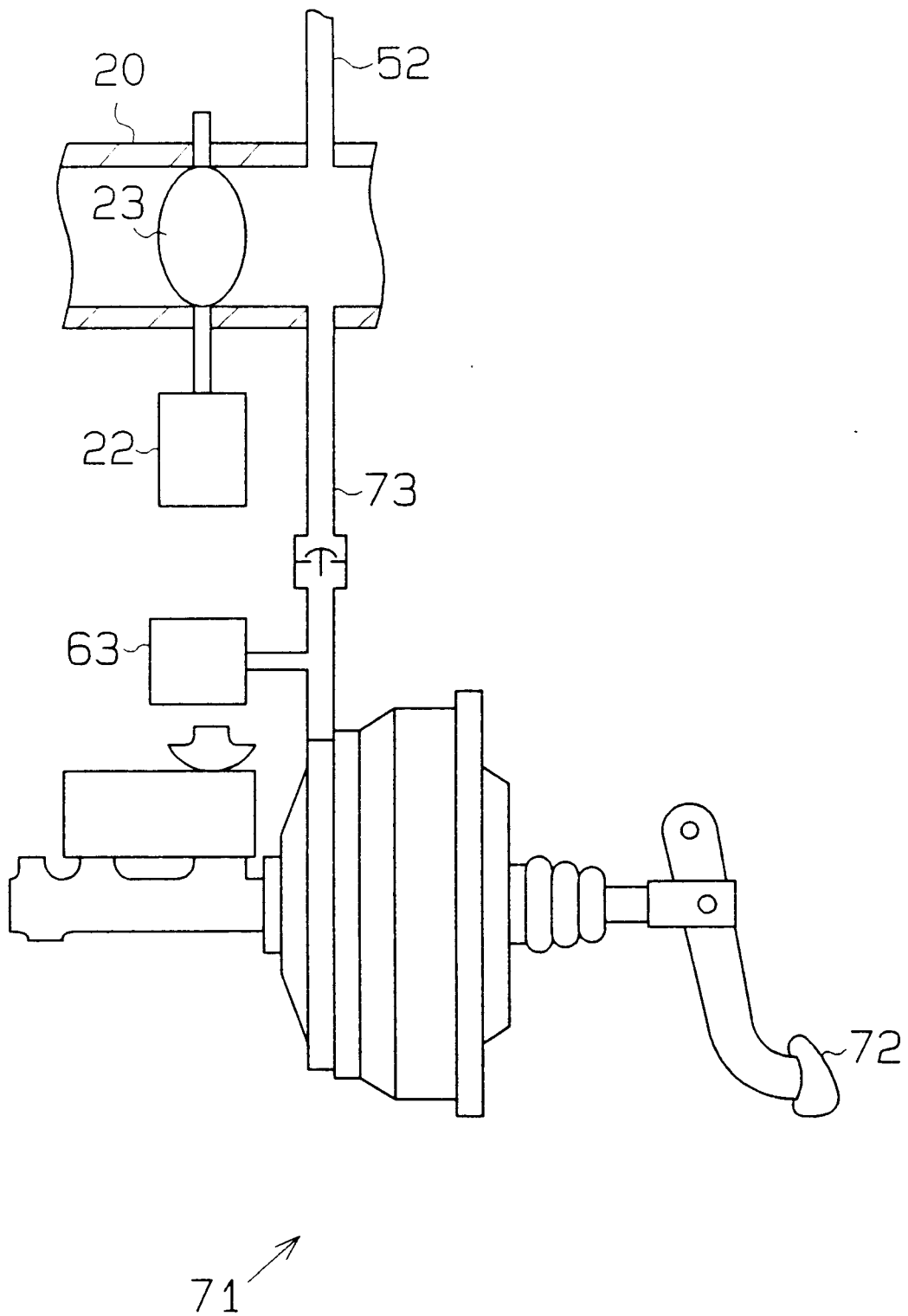
FIG. 3 is a schematic drawing showing a brake booster.

As shown in FIGS. 1 and 3, a brake booster 71 for enhancing the braking force of the vehicle is connected to the intake duct 20. The brake booster 71 increases the force applied by the brake pedal 72. The boosted brake pedal force is converted into hydraulic pressure and used to actuate brake actuators (not shown) provided for each wheel. The brake booster 71 is connected to the downstream side of the throttle valve 23 in the intake duct 20 by a connecting pipe 73 and is actuated by the negative pressure produced in the duct 20. A pressure sensor 63 is arranged in the connecting pipe 73 to detect the pressure PBK (absolute pressure) in the brake booster 71.

The ECU 30 is a digital computer provided with a random access memory (RAM) 32, a read only memory (ROM) 33, a central processing unit (CPU) 34, which is a microprocessor, an input port 35 and an output port 36. A bidirectional bus 31 connects the RAM 32, the ROM 33, the CPU 34, the input port 35, and the output port 36 to one another.

An acceleration pedal 24 is connected to a pedal angle sensor 26A. The pedal angle sensor 26A generates voltage proportional to the degree of depression of the acceleration pedal 24. This enables the acceleration pedal depression amount ACCP to be detected. The voltage outputted by the pedal angle sensor 26A is inputted into the CPU 30 by way of an analog-to-digital (A/D) converter 37 and the input port 35. The acceleration pedal 24 is also provided with a complete closure switch 26B, which detects whether the acceleration pedal 24 is not pressed at all. The closure switch 26B outputs a complete closure signal XIDL of one when the acceleration pedal 24 is not pressed at all and outputs the complete closure signal XIDL of zero when the acceleration pedal 24 is pressed. The output voltage of the closure switch 26B is inputted to the CPU 34 via the input port 35.

A top dead center position sensor 27 generates an output pulse when, for example, the piston in the first cylinder 1a reaches the top dead center position. The output pulse is inputted into the CPU 34 via the input port 35. A crank angle sensor 28 generates an output pulse each time a crankshaft of the engine 1 is rotated, for example, by a crank angle CA of 30 degrees. The output pulse sent from the crank angle sensor 28 is inputted into the CPU 34 via the input port 35. The CPU 34 reads the output pulses of the top dead center position sensor 27 and the crank angle sensor 28 to compute the engine speed NE.

The rotational angle of the shaft 18 is detected by a swirl control valve sensor 29 to measure the opening area of the swirl control valves 17. The signal output of the swirl control valve sensor 29 is inputted into the CPU 34 via an A/D converter 37 and the input port 35. The throttle sensor 25 detects the throttle angle TA. The signal output of the throttle sensor 25 is inputted to the CPU 34 via an A/D converter 37 and the input port 35.

An intake pressure sensor 61 is provided to detect the pressure in the surge tank 16 (intake pressure PIM). A coolant temperature sensor 62 is provided to detect the temperature of the engine coolant (coolant temperature THW). A vehicle speed sensor 64 is provided to detect the speed of the vehicle (vehicle speed SPD). The sensors 61, 62, 64 output signals based on detected values to the CPU 34 by way of corresponding A/D converters 37 and the input port 35. The pressure sensor 63 also outputs signals based on the pressure value it detects to the CPU 34 by way of an A/D converter 37 and the input port 35.

The sensors 25–29, 61–64 and the switch 26B serve as devices for detecting the running state of the engine 1.

The output port 36 is connected to the fuel injection valves 11, the step motors 19, 22, the ignitor 12, and the EGR valve 53 (step motor) by way of drive circuits 38. The ECU 30 optimally controls the fuel injection valves 11, the step motors 19, 22, the ignitor 12 (ignition plugs 10), and the EGR valve 53 with control programs stored in the ROM 33 based on signals sent from the sensors 25–29, 61–64 and the switch 26B.

Figure 4:
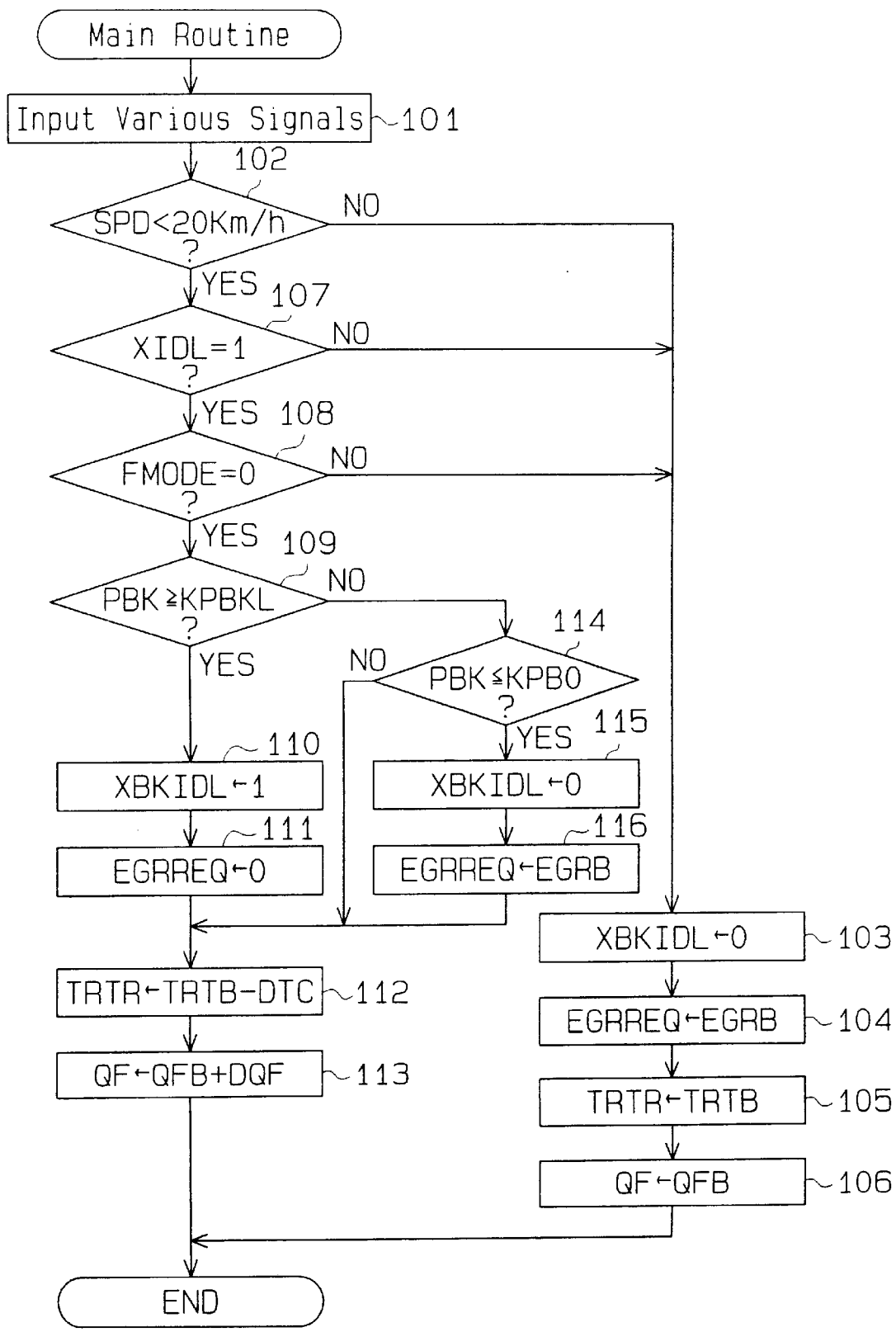
FIG. 4 is a flowchart illustrating a main control routine executed by an ECU.

Control programs performed by the fuel injection controlling apparatus of the above described engine 1 will hereafter be described with reference to flowcharts. FIG. 4 is a flowchart showing a main routine for computing a throttle valve opening of the throttle valve 23 and a target fuel injection amount of the injection valve 11. This routine is executed by the ECU 30.

When entering the routine, the ECU 30 inputs signals indicating the current state of the engine 1 and the vehicle such as the engine speed NE, the degree of acceleration pedal depression ACCP, the vehicle speed SPD and the internal pressure PBK of the brake booster 71.

At step 102, the ECU 30 determines whether the present vehicle speed SPD is lower than a predetermined speed (e.g., 20 km/h). If the vehicle speed SPD is equal to or higher than the predetermined speed, the ECU 30 determines that there is no need to execute an operation for producing negative pressure for actuating the brake booster 71 and proceeds to step 103.

At step 103, the ECU 30 sets a flag XBKIDL to zero. The value of the flag XBKIDL indicates whether an operation for producing negative pressure needs to be executed for actuating the brake booster 71. The flag XBKIDL is set at one if the operation needs to be executed. If the operation does not need to be executed, the flag XBKIDL is set at zero. In the subsequent step 104, the ECU 30 substitutes a basic EGR opening EGRB computed in another routine for a required EGR opening EGRREQ.

At step 105, the ECU 30 substitutes a basic throttle valve opening TRTB computed in another routine for a required throttle valve opening TRTR. At the next step 106, the ECU 30 substitutes a basic injection amount QFB computed in another routine for a final target injection amount QF. Thereafter, the ECU 30 temporarily terminates the subsequent processing. Thus, the engine 1 is controlled based on the basic EGR opening EGRB, the basic throttle valve opening TRTB and the basic injection amount QFB, which are computed in other routines.

If the vehicle speed SPD is lower than the predetermined speed at step 102, on the other hand, the ECU 30 proceeds to step 107. At step 107, the ECU 30 judges whether a complete closure signal XIDL inputted from the complete closure switch 26B is one. If the signal XIDL is not one, but is zero, the ECU 30 determines that the acceleration pedal 72 is depressed and thus that the operation to produce negative pressure for actuating the brake booster 71 is not necessary. The ECU 30 then proceeds to step 103. The ECU 30 temporarily terminates the subsequent processing after executing steps 103 to 106.

If the complete closure signal XIDL from the complete closure switch 26B is one, on the other hand, the ECU 30 judges that the acceleration pedal 72 is not pressed at all and the engine 1 is idling or in the state similar to idling (that is, when the vehicle is moving at a low speed). The ECU 30 then proceeds to step 108. At step 108, the ECU 30 judges whether a current combustion mode FMODE is zero. The combustion mode FMODE has a value of zero when stratified combustion is performed and has a value of one when uniform charge combustion is performed. If the current combustion mode FMODE is not zero, but is one, the ECU 30 judges that uniform charge combustion is being performed and thus that the negative pressure available for actuating the brake booster 71 is sufficient. The ECU 30 then moves to step 103. The ECU 30 then executes steps 103 to 106 and temporarily terminates the subsequent processing.

If the current combustion mode FMODE is zero, the ECU 30 judges that stratified charge combustion is being performed and that the negative pressure available for actuating the brake booster 71 may not be sufficient. The ECU 30 then proceeds to step 109. At step 109, the ECU 30 judges whether the internal pressure PBK of the brake booster 71 inputted in the current routine is equal to or greater than a predetermined first reference pressure KPBKL (absolute pressure). In other words, the ECU 30 judges whether the negative pressure available for actuating the brake booster 71 is insufficient. If the internal pressure of the brake booster 71 is equal to or greater than the first reference pressure KPBKL, the ECU 30 judges that the negative pressure in the intake passage is insufficient for actuating the brake booster 71 and proceeds to step 110.

At step 110, the ECU 30 sets the flag XBKIDL to one. At the subsequent step 111, the ECU 30 sets the required EGR opening EGRREQ to zero for facilitating production of negative pressure regardless of the value of the basic EGR opening EGRB, which is computed in another routine. Accordingly, the EGR valve 53 is fully closed and recirculation of exhaust gas to the intake duct 20 is completely stopped. This prevents the pressure in the intake duct 20 (absolute pressure) from increasing. In other words, negative pressure for actuating the brake booster 71 is conserved.

At step 112, the ECU 30 subtracts a closing amount DTC (DTC≧0) computed in a closing amount determining routine, which will be described below, from the basic throttle valve opening TRTB, which is computed in another routine. The ECU 30 substitutes the resultant for the required throttle valve opening TRTR. Therefore, if the closing amount DTC is greater than zero, the required throttle valve opening TRTR is smaller than the basic throttle valve opening TRTB by the closing amount DTC. That is, the actual opening of the throttle valve 23 becomes smaller than the basic throttle valve opening TRTB by the closing amount DTC. This produces additional negative pressure, which is necessary for actuating the brake booster 71, in the intake duct 20. That is, the pressure in the intake passage is lowered.

At step 113, the ECU 30 adds a fuel increase amount DQF (DQF≧0) computed in a fuel increase determining routine, which will be described below, to the basic injection amount QFB, which is computed in another routine. The ECU 30 substitutes the resultant for a final target injection amount QF. Therefore, if the fuel increase amount DQF is set greater than zero, the target injection amount QF is greater than the basic injection amount QFB by the fuel increase amount DQF. That is, the actual amount of fuel injection becomes greater than the basic injection amount QFB by the fuel increase amount DQF. This prevents the engine speed NE from decreasing. The ECU 30 then temporarily terminates the subsequent processing.

If the internal pressure PBK of the brake booster 71 is less than the first reference pressure KPBKL at step 109, the ECU 30 proceeds to step 114. At step 114, the ECU 30 judges whether the internal pressure of the brake booster 71 is equal to or less than a second reference pressure KPBO. The second reference pressure KPBO is less than the first reference pressure KPBKL. If the internal pressure PBK of the brake booster 71 is greater than the second reference pressure KPBO, the ECU 30 judges that negative pressure for actuating the brake booster 71 is still insufficient and thus executes the above described steps 112 and 113.

If the internal pressure PBK in the brake booster 71 is equal to or lower than the second reference pressure KPBO, the ECU 30 judges that sufficient negative pressure for actuating the brake booster 71 is available and proceeds to step 115. At step 115, the ECU 30 sets the flag XBKIDL to zero. In the subsequent step 116, the ECU 30 substitutes a basic EGR opening EGRB computed in another routine for the required EGR opening EGRREQ.

Thereafter, the ECU 30 proceeds to step 112. After the flag XBKIDL is set to zero in step 115, the closing amount DTC computed in the closing amount determining routine is gradually decreased to zero as described below. Thus, repeating the processing from step 115 to step 112 causes the required throttle valve opening TRTR to gradually approach the basic throttle valve opening TRTB.

Next, the ECU 30 moves to step 113. After the flag XBKIDL is set to zero in step 115, the fuel increase amount DQF computed in the fuel increase determining routine is gradually decreased to zero in accordance with the decrease of the throttle valve opening DTC as described below. Thus, repeating step 115 and step 113 causes the target injection amount QF to gradually approach the basic injection amount QFB.

Figure 5:
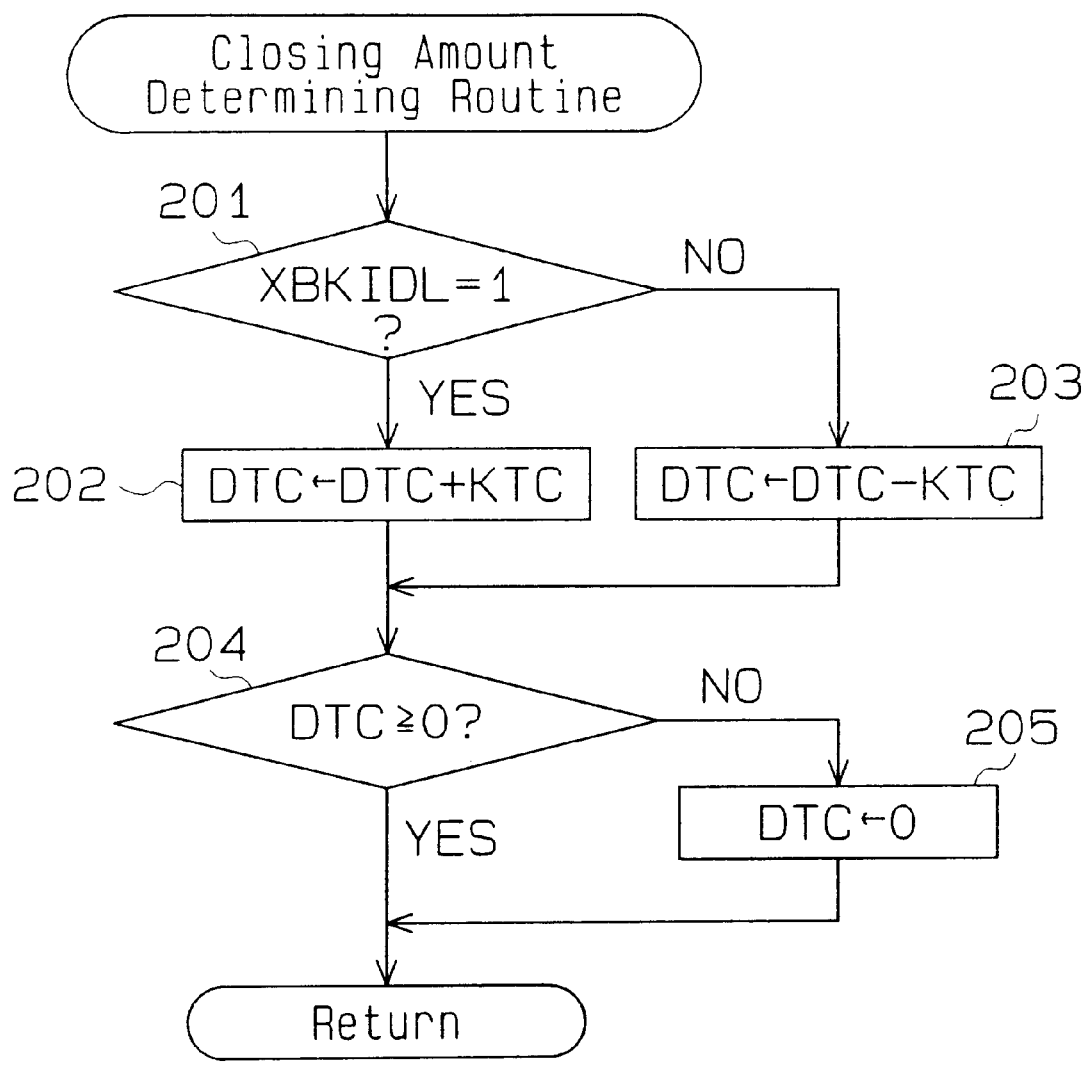
FIG. 5 is a flowchart illustrating a closing amount determining routine executed by the ECU.

In the above described routine, whether negative pressure necessary for actuating the brake booster 71 needs to be produced is determined in steps 102, 107, 108, 109 and 114. The required throttle valve opening TRTR and the target injection amount QF are set based on the determination Steps for computing the above described closing amount DTC will now be described. FIG. 5 is a flowchart showing a closing amount determining routine. This routine is an interrupt executed by the ECU 30 at every predetermined crank angle CA of, for example, 180 degrees.

When entering this routine, the ECU 30 judges whether the flag XBKIDL is one at step 201. If the flag XBKIDL is one, the ECU 30 proceeds to step 202 for increasing the closing amount DTC. At step 202, the ECU 30 adds a predetermined value KTC to the current closing amount DTC for obtaining a new closing amount DTC.

If the flag XBKIDL is zero, the ECU 30 proceeds to step 203 for decreasing the closing amount DTC. At step 203, the ECU 30 subtracts the predetermined value KTC from the current closing amount DTC for obtaining a new closing amount DTC.

After steps 202 or 203, the ECU 30 moves to step 204. At step 204, the ECU 30 judges whether the new closing amount DTC is equal to or greater than zero. If the new closing amount DTC is equal to or greater than zero, the ECU 30 temporarily terminates the subsequent processing. If the new closing amount DTC is smaller than zero, that is, has a negative value, the ECU 30 proceeds to step 205. At step 205, the ECU 30 sets the closing amount DTC to zero and temporarily terminates the subsequent processing.

Figure 6:
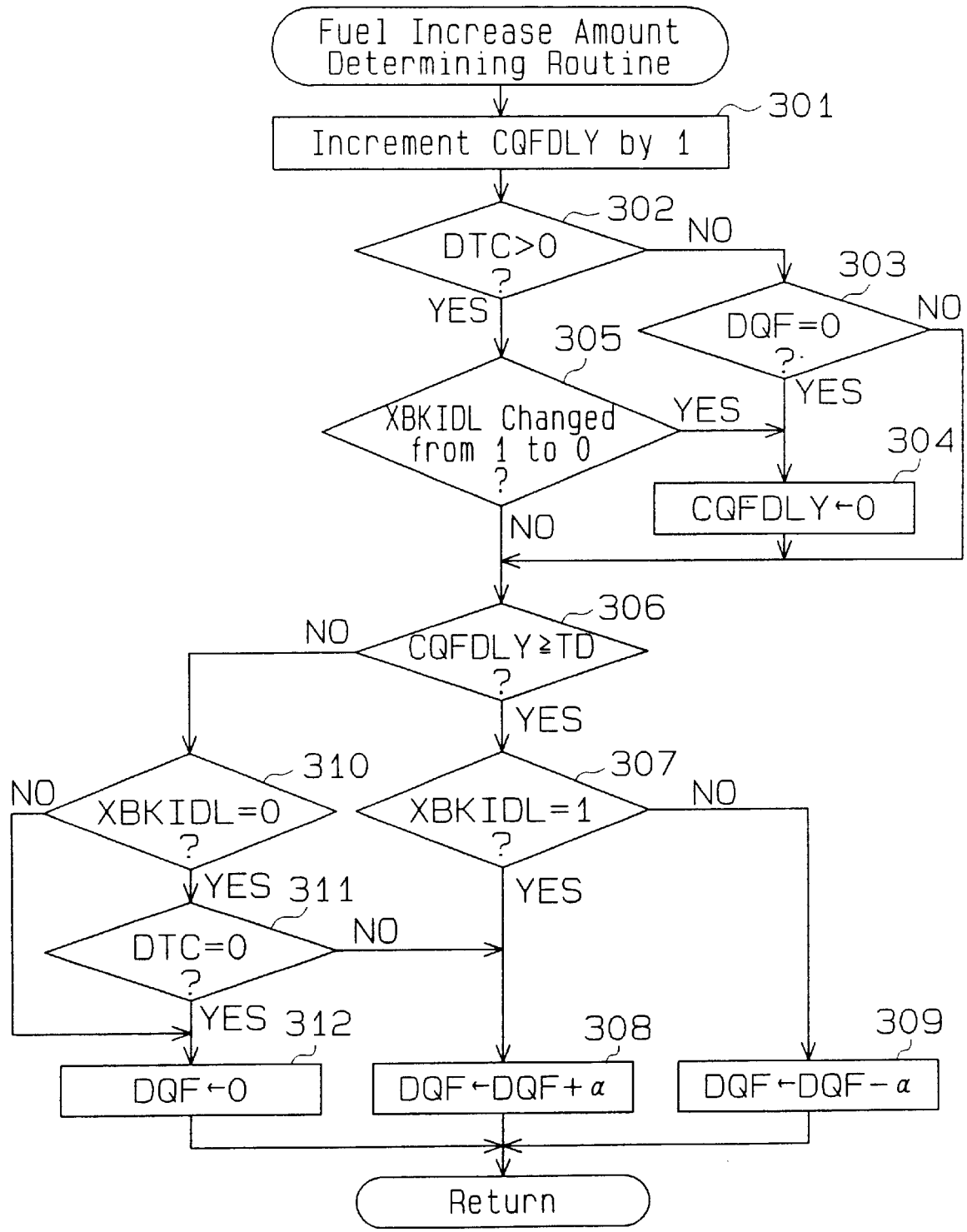
FIG. 6 is a flowchart illustrating a fuel increase amount determining routine executed by the ECU.

In the above described closing amount determining routine, the closing amount DTC is increased or decreased in a region greater than zero according to the value of the flag XBKIDL, which indicates whether negative pressure is sufficient. In other words, the value of DTC is constantly controlled to be equal to or greater than zero Steps for computing the above described fuel increase amount DQF will now be described. FIG. 6 is a flowchart showing a fuel increase amount determining routine. This routine is an interrupt executed by the ECU 30 at every predetermined crank angle CA (for example, 180 degrees).

When entering this routine, the ECU 30 increments a counter value CQFDLY stored in a delay counter by one at step 301.

At step 302, the ECU 30 judges whether the current closing amount DTC is greater than zero, that is, whether the value DTC is not zero. If the throttle value DTC is zero, the ECU 30 proceeds to step 303. At step 303, the ECU 30 judges whether the current fuel increase amount DQF is zero. If the fuel increase amount DQF is zero, the ECU 30 moves to step 304. At step 304, the ECU 30 clears the counter value CQFDLY of the delay counter to zero. Thereafter, the ECU 30 proceeds to step 306. If the current fuel increase amount DQF is not zero, on the other hand, the ECU 30 proceeds to step 306.

If the current closing amount DTC is greater than zero at step 302, the ECU 30 proceeds to step 305. At step 305, the ECU 30 judges whether the flag XBKIDL has just changed to zero from one in the current routine. If the flag XBKIDL has just changed to zero from one, the ECU 30 moves to step 304 for clearing the counter value CQFDLY of the delay counter to zero. The ECU 30 thereafter proceeds to step 306. If the flag XBKIDL has not just become zero from one, the ECU directly proceeds to step 306. In this manner, during steps 301 to 305, the counter value CQFDLY is cleared to zero when one of the following occurs: 1) the closing amount DTC is zero and the fuel increase amount DQF is zero, or 2) the flag XBKIDL has just changed to zero from one.

The ECU 30 proceeds to step 306 from step 303, 304 or 305. At step 306, the ECU 30 judges whether the current delay value CQFDLY stored in the counter has reached a delay time TD. The value of the delay time TD is determined in consideration of the time lag between a change of the opening of the throttle valve 23 and the resulting change of intake air amount into the combustion chamber 5 and the time lag between a change of the opening of the throttle valve 23 and the resulting change of pumping loss of the engine 1. The computation of the delay time TD will be discussed in detail below. When the counter value CQFDLY reaches the delay time TD, the ECU 30 proceeds to step 307. At step 307, the ECU 30 judges whether the flag XBKIDL is one. If the flag XBKIDL is one, the ECU 30 moves to step 308.

At step 308, the ECU 30 adds a predetermined value α to the current fuel increase amount DQF for increasing the fuel increase amount DQF. The ECU 30 sets the resultant as a new fuel increase amount DQF. The ECU 30 then temporarily terminates the subsequent processing.

If the flag XBKIDL is not one but zero at step 307, the ECU 30 proceeds to step 309. At step 309, the ECU 30 subtracts the predetermined value α from the current fuel increase amount DQF for decreasing the fuel increase amount DQF. The ECU 30 sets the resultant as a new fuel increase amount DQF. The ECU 30 then temporarily terminates the subsequent processing If the current delay counter value CQFDLY has not reached the delay time TD at step 306, the ECU 30 proceeds to step 310. At step 310, the ECU 30 judges whether the flag XBKIDL is zero. If the flag XBKIDL is zero, the ECU 30 proceeds to step 311. At step 311, the ECU 30 judges whether the current closing amount DTC is zero. If the closing amount DTC is zero, the ECU 30 sets the fuel increase amount DQF to zero at step 312 and temporarily terminates the subsequent processing. If the closing amount DTC is not zero at step 311, the ECU 30 proceeds to step 308. At step 308, the ECU 30 adds the predetermined value α to the current fuel increase amount DQF for increasing the fuel increase amount DQF. The ECU 30 sets the resultant as a new fuel increase amount DQF. The ECU 30 then temporarily terminates the subsequent processing.

If the flag XBKIDL is not zero but one at step 310, the ECU 30 sets the fuel increase amount DQF to zero at step 312 and temporarily terminates the processing.

Figure 7:
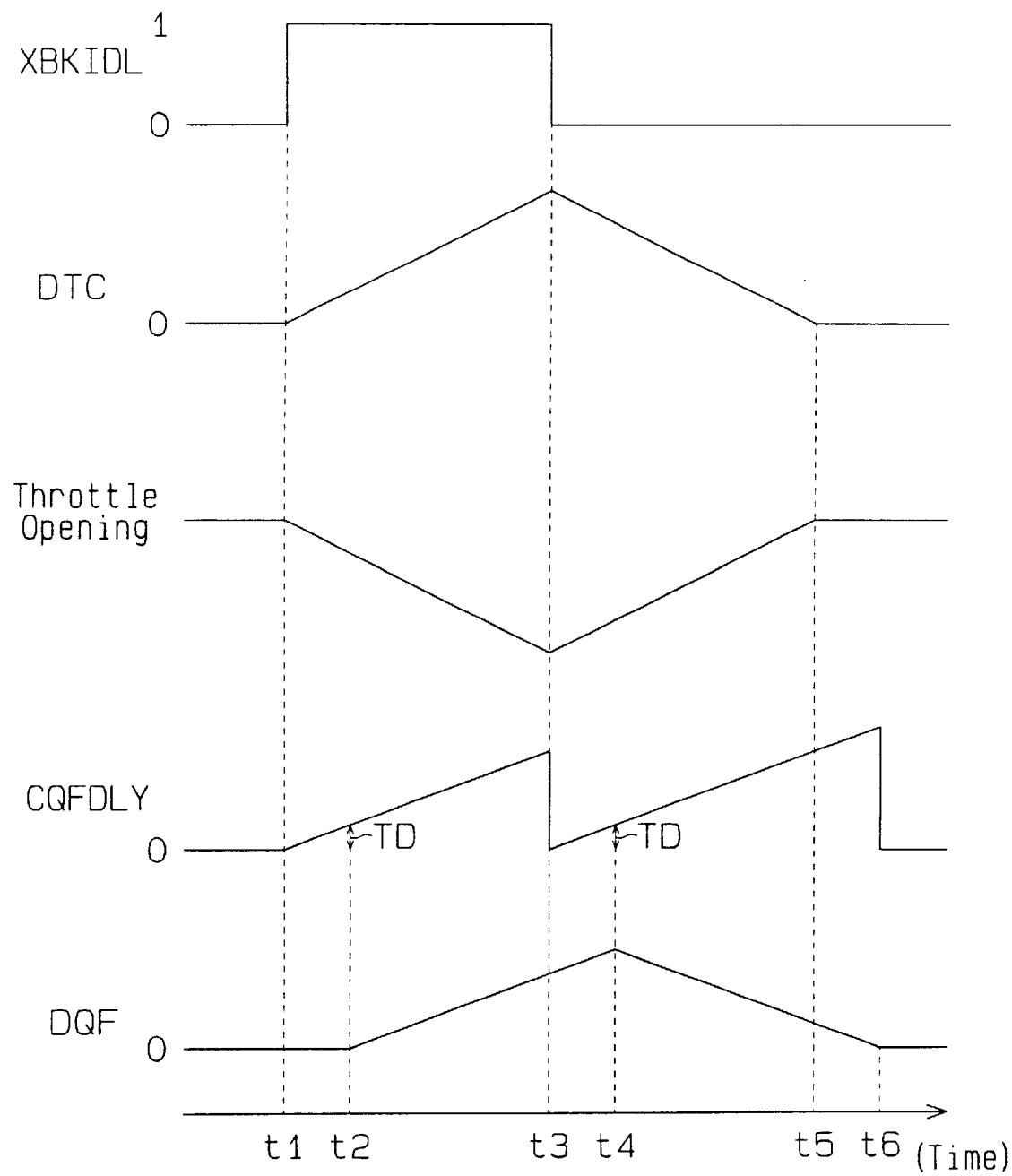
FIG. 7 is a timing chart showing changes in a flag, throttling amount, throttle valve opening, the counter value of a delay counter and fuel increase amount.

As described so far, the fuel increase amount DQF is determined in accordance with the counter value CQFDLY of the delay counter, the flag XBKIDL and the closing amount DTC in the fuel increase amount determining routine. More specifically, if the flag XBKIDL changes from zero to one at a time t1 with the closing amount DTC and the fuel increase amount DQF both being zero as shown in FIG. 7, incrementing of the counter value CQFDLY is started. Also, the closing amount DTC is gradually increased, or incremented, by the predetermined value KTC. The throttle valve opening is gradually decreased, accordingly. The fuel increase amount DQF is maintained at zero until the counter value CQFDLY reaches the delay time TD at a time t2. That is, from the time t1 to the time t2, the steps 301, 302, 305, 306, 310 and 312 in the fuel increase amount determining routine illustrated in FIG. 6 are processed.

When the counter value CQFDLY reaches the predetermined delay time TD at the time t2, the fuel increase amount DQF starts increasing gradually, or starts being incremented by the predetermined value α. The flag XBKIDL is changed to zero from one at a time t3. That is, from the time t2 to time t3, the steps 301, 302, 305, 306, 307 and 308 in the routine of FIG. 6 are processed.

When the flag XBKIDL is changed from one to zero at the time t3, steps 305 and 304 in FIG. 6 are processed. Thus, the counter value CQFDLY is cleared to zero. The incrementing of the counter value CQFDLY is restarted from zero. Further, when the flag XBKIDL becomes zero, the closing amount DTC starts decreasing gradually, or starts being decremented by the predetermined value KTC. The throttle valve opening is gradually increased, accordingly. On the other hand, the fuel increase amount DQF is continuously incremented by the predetermined value α until the counter value CQFDLY reaches the predetermined delay time TD at a time t4. That is, from the time t3 to the time t4, steps 301, 302, 305, 306, 310, 311 and 308 in the routine of FIG. 6 are processed.

When the counter value CQFDLY reaches the predetermined delay time TD again at the time 4, the fuel increase amount DQF starts decreasing gradually, or starts being decremented by the predetermined value α. The closing amount DTC becomes zero at a time t5. That is, from the time t4 to t5, the steps 301, 302, 305, 306, 307 and 309 in the routine of FIG. 6 are processed.

Even if the closing amount DTC becomes zero at the time t5, the fuel increase amount DQF is continuously decremented by the predetermined value α until DQF becomes zero at a time t6. That is, from the time t5 to the time t6 steps 301, 302, 303, 306, 307 and 309 in the routine of FIG. 6 are processed. When the fuel increase amount DQF becomes zero with the closing amount DTC being zero at the time t6, steps 302, 303 and 304 in the routine of FIG. 6 are processed. Thus, the counter value CQFDLY is cleared to zero. This state is maintained until the flag XBKIDL is changed from zero to one and the closing amount DTC has a positive value.

The operation and advantages will now be explained.

In the above illustrated embodiment, whether the pressure in the intake passage is low enough for actuating the brake booster 71 is determined. When it is determined that the intake pressure is too high, the opening of the throttle valve 23 is decreased by the closing amount DTC. This produces the negative pressure necessary for actuating the brake booster 71 in the intake duct 20.

Decreasing the opening of the throttle valve 23 for producing the negative pressure necessary for actuating the brake booster 71 increases pumping loss thereby lowering the engine speed NE. However, in the illustrated embodiment, when the throttle valve 23 is throttled back by the closing amount DTC, the target injection amount QF is increased by the fuel increase amount DQF. Thus, unlike feedback control, which increases the amount of injected fuel in accordance with decrease of the engine speed, the present invention causes no response delay in the control of the fuel injection amount. Accordingly, the engine speed NE is prevented from lowering and is thus stabilized. Therefore, stalling of the engine is avoided.

The fuel increase amount DQF is incremented or decremented by the predetermined value α as the closing amount DTC is incremented or decremented by the predetermined value KTC. In other words, the amount of fuel injected from the injection valve 11 is varied in accordance with changes of the pumping loss of the engine 1. This further stabilizes the engine speed NE.

The negative pressure necessary for actuating the brake booster 71 is produced by decreasing the amount of air passing through the intake duct 20 with the throttle valve 23. Therefore, there is no need to provide an extra device for producing negative pressure. In other words, existing equipment can be used for producing the negative pressure. This reduces the cost of the engine 1.

When the opening of the throttle valve 23 is changed, it takes a certain time until the change is reflected on the amount of intake air drawn into the combustion chamber 5. However, since fuel is directly injected into the combustion chamber 5 from the injection valve 11, a change in the amount of fuel injected from the injection valve 11 is quickly reflected on the amount fuel supplied to the combustion chamber 5. In the illustrated embodiment, the closing amount DTC starts changing at the times t1, t3 in FIG. 7, in other words, the opening of the throttle valve 23 starts changing at the times t1, t3. Then, the operation for increasing or decreasing the fuel injection amount is started at the times t2, t4 in FIG. 7, at which times the delay time TD has elapsed since the times t1, t3. The delay time TD is determined in consideration of the time lag between the change of the opening of the throttle valve 23 and the resulting change of the intake air amount. Therefore, the time at which the intake air amount into the combustion chamber is changed is substantially synchronized with the time at which the amount of fuel supplied to the combustion chamber 5 is changed. This enables the engine speed NE to be accurately controlled thereby further stabilizing the engine speed NE.

When the opening of the throttle valve 23 is changed, it takes a certain time until the change is reflected on the pumping loss of the engine 1. The delay time TD is determined also in consideration of the time lag between the change of the opening of the throttle valve 23 and the change of the pumping loss. Thus, the engine speed NE is even more accurately controlled.

As described in BACKGROUND OF THE INVENTION section, stratified charge combustion is performed with the throttle valve 23 being substantially fully open. This results in insufficient negative pressure in the intake duct 20 for actuating the brake booster 71. In the above illustrated embodiment, steps for producing negative pressure are executed during stratified charge combustion. Thus, the problems described in BACKGROUND OF THE INVENTION section are avoided.

It should be apparent to those skilled in the art that the present invention may be embodied in many other specific forms without departing from the spirit or scope of the invention. Particularly, it should be understood that the invention may be embodied in the following forms.

Change of the opening of the throttle valve 23 per unit of time varies in accordance with the value of the predetermined value KTC, which is added to or subtracted from the closing amount DTC. Change of the amount of fuel injected from the fuel injection valve 11 per unit of time varies in accordance with the value of the predetermined value α, which is added to or subtracted from the fuel increase value DQF. In the above illustrated embodiment, the values KTC and α are constant, and thus changes of the throttle valve opening and the fuel injection amount in a unit of time are constant. However, changes of the throttle valve opening and the fuel injection amount in a unit of time may be varied by changing the values KTC and α in accordance with changes of the internal pressure PBK of the brake booster 71.

Figure 8:
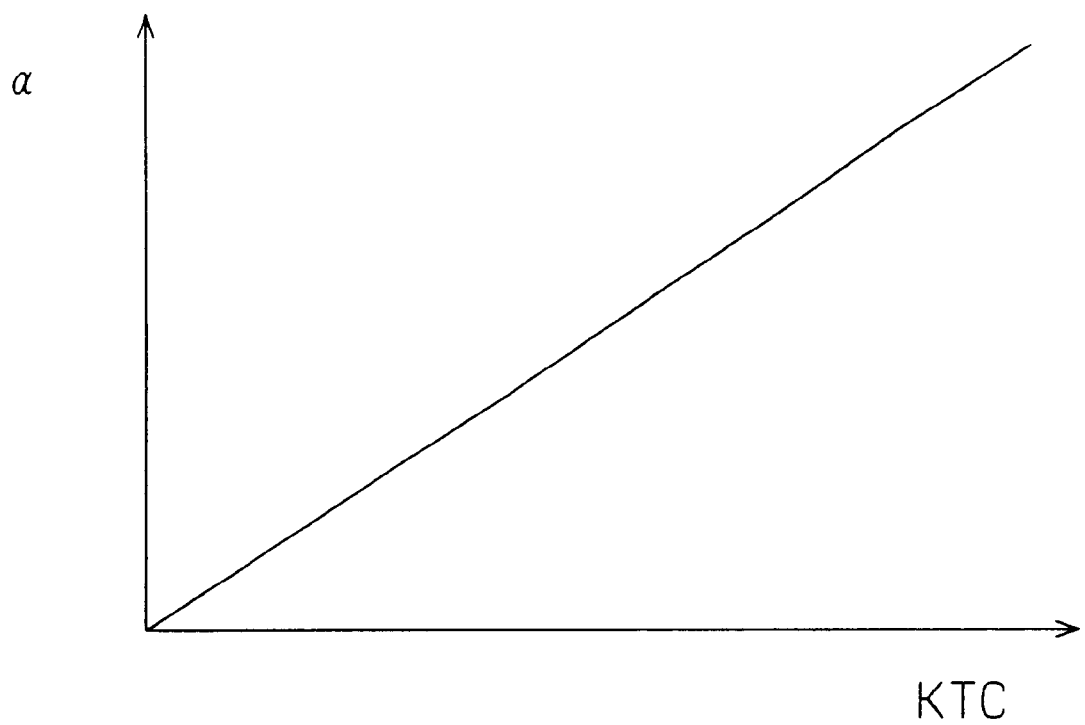
FIG. 8 is a graph showing the relationship between a predetermined value KTC, which is related to a closing amount, and a predetermined value $\alpha$, which is related to fuel increase in a second embodiment.

In this case, the predetermined value α preferably increases as the value KTC increases as illustrated in the graph of FIG. 8. This way, the change of the amount of injected fuel per unit of time increases as the change of the throttle opening per unit of time increases. This allows changes in the fuel injection amount to accurately follow changes in the throttle opening and thus stabilizes the engine speed NE.

In the embodiment illustrated in FIGS. 1–7, the throttle opening is gradually changed by incrementing or decrementing the closing amount DTC by the predetermined value KTC. However, the closing amount DTC may be constantly computed in accordance with changes in the current internal pressure PBK of the brake booster 71, and the throttle opening may be changed based on the computed closing amount DTC. In this case, it should be apparent that the fuel increase amount DQF is computed in accordance with the computed closing amount DTC, and that the amount of fuel injection is controlled based on the computed fuel increase amount DQF for stabilizing the engine speed NE.

As long as adequate negative pressure for actuating the brake booster 71 is produced and the engine speed NE is stabilized as described above, the throttle opening and the fuel injection amount may be controlled by any method.

Figure 9:
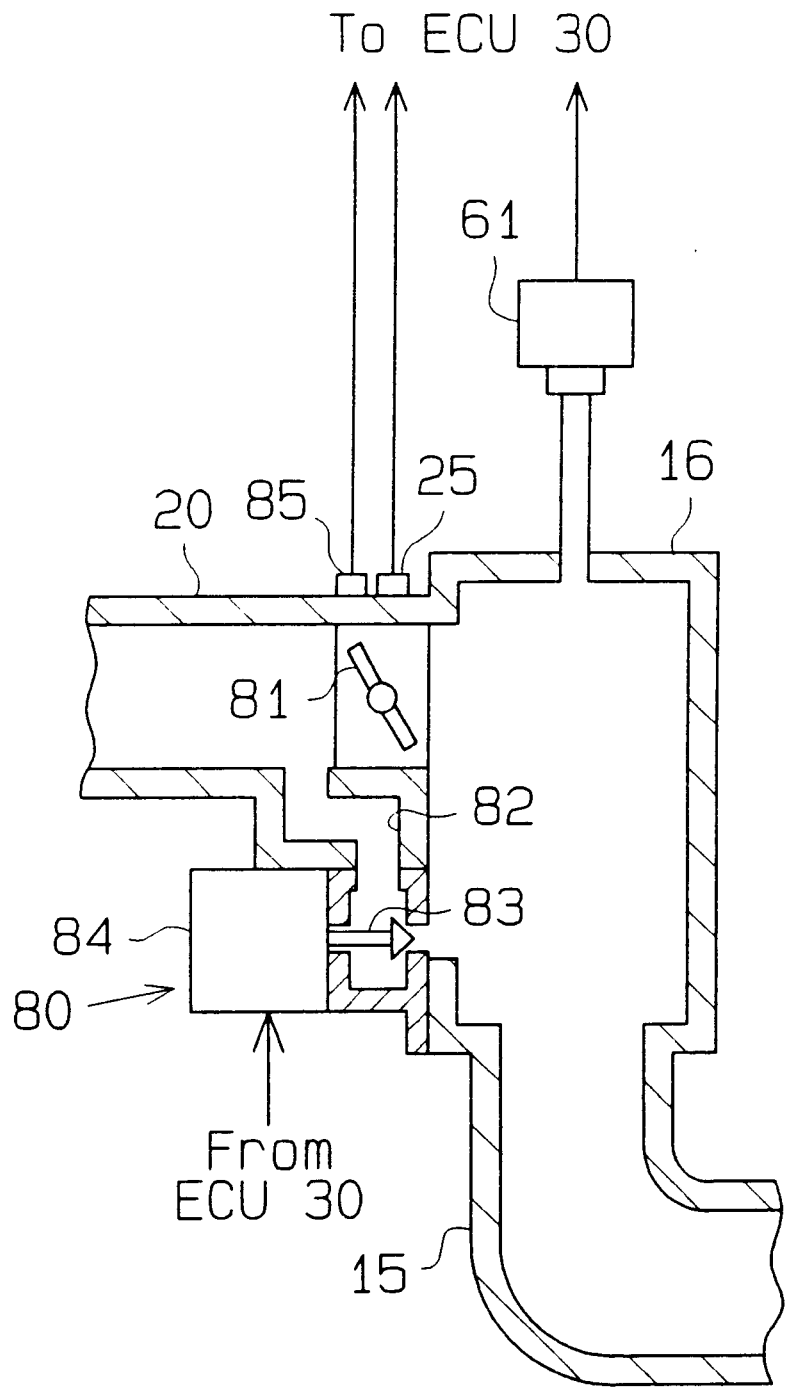
FIG. 9 is a partial cross-sectional view illustrating an ISC mechanism according to a third embodiment.

In the embodiment illustrated in FIGS. 1–7, means for producing negative pressure is constituted by an electronically controlled throttle mechanism that includes throttle valve 23 located in the intake duct 20 and the step motor 22 for opening and closing the throttle valve 23. However, the negative pressure producing means may be constituted by an idle speed control (ISC) mechanism 80 illustrated in FIG. 9. The ISC mechanism 80 is not employed in an engine having an electronically controlled throttle mechanism but is employed in an engine having a throttle valve 81 that is operably connected to the acceleration pedal 24 by a cable (not shown). The throttle sensor 25 for detecting the throttle opening TA and an idle switch 85 for detecting that the valve 81 is fully closed (in other words, that the engine 1 is idling) are provided in the vicinity of the throttle valve 81.

The ISC mechanism 80 includes a bypass intake passage 82 bypassing the throttle valve 81, an idle speed control valve (ISCV) 83 located in the passage 82 and an actuator (solenoid) 84 for opening and closing the valve 83. When the idle switch 85 detects that the throttle valve 81 is fully closed (that the engine 1 is idling), the ECU 30 duty controls the solenoid 84 for adjusting the opening of the ISCV 83. This controls the amount of air passing through the bypass passage 82 thereby controlling the amount of intake air entering the combustion chambers. When the engine 1 is idling and stratified charge combustion is performed, the ISCV 83 is almost fully open. At this time, controlling the opening of the ISCV 83, instead of the opening of the throttle valve 81, in the manner described in the first embodiment brings about the same results and advantages as the first embodiment.

Further, the negative pressure producing means may be constituted by the EGR mechanism 51 that includes the above described EGR valve 53. Alternatively, the negative pressure producing means may be separately constructed from the throttle mechanism, the ISC mechanism and the EGR mechanism.

Further, the negative pressure producing means may be constituted by combining the above described mechanisms as necessary.

In the embodiment of FIGS. 1–7, the delay time TD used when the increment of the fuel increase amount DQF is started has the same value as the delay time TD used when the decrement of the fuel increase amount DQF is started. However, these values may be different.

In the embodiment of FIGS. 1–7, negative pressure for actuating the brake booster 71 is produced when the vehicle speed SPD is lower than a predetermined speed (for example, 20 km/h) and the acceleration pedal 72 is not depressed as illustrated in steps 102, 107 of FIG. 4. However, the steps for producing negative pressure for actuating the brake booster 71 may be executed not only when the vehicle is moving at a low speed or the engine 1 is idling but also when a small load is acting on the engine 1.

According to the embodiment of FIGS. 1–7, the present invention is employed in a cylinder injection type engine 1. However, the present invention may be employed in any type of engine as long as the engine is able to perform stratified charge combustion. For example, the present invention may be employed in an engine in which fuel is injected toward the back faces of the intake valves 6a, 6b for performing stratified charge combustion. Further, in the illustrated embodiment, the fuel injection valve 11 is provided in the vicinity of the intake valves 6a, 6b. However, the valve 11 may be located at any position as long as the valve 11 can directly inject fuel into the combustion chamber 5.

The engine 1 according to the first embodiment includes helical intake ports 7a, 7b, which generate a swirl of intake air. However, a swirl is not required. Therefore, the swirl control valve 17 and the step motor 19 may be omitted.

The first embodiment is employed in a gasoline engine 1. However the present invention may be embodied in a diesel engine.

Therefore, the present examples and embodiments are to be considered as illustrative and not restrictive and the invention is not to be limited to the details given herein, but may be modified within the scope and equivalence of the appended claims.

What is claimed is:

1. An apparatus for controlling fuel injection in an internal combustion engine that is able to perform stratified charge combustion, wherein the air-fuel ratio varies within a combustion chamber during stratified charge combustion, the apparatus comprising:

injection means for injecting fuel into the combustion chamber to perform the stratified charge combustion;

an intake passage connected to the combustion chamber for supplying air to the combustion chamber;

negative pressure producing means for lowering the pressure in the intake passage;

a brake booster operated by pressure applied thereto from the intake passage to increase a braking force;

sensing means for sensing the value of the pressure applied to the brake booster;

first control means for controlling the negative pressure producing means to lower the pressure in the intake passage when the value of the pressure sensed by the sensing means is above a predetermined value, which represents a pressure required to properly operate the brake booster, during the stratified charge combustion; and second control means for controlling the injection means to increase amount of fuel injected from the injection means in accordance with the operation of the negative pressure producing means for suppressing a decrease in the engine speed when the pressure in the intake passage is lowered by the first control means during the stratified charge combustion.

2. The apparatus according to claim 1, wherein the second control means controls the injection means to increase the amount of fuel injected from the injection means in accordance with a lowering of the pressure in the intake passage.

3. The apparatus according to claim 1, wherein the negative pressure producing means includes an adjusting mechanism for adjusting the flow rate of air supplied to the combustion chamber from the intake passage, wherein the adjusting mechanism decreases the flow rate of air supplied to the combustion chamber from the intake passage to lower the pressure in the intake passage.

4. The apparatus according to claim 3, wherein the adjusting mechanism includes:

a throttle valve located in the intake passage for controlling the opening amount of the intake passage; and an actuator for actuating the throttle valve.

5. The apparatus according to claim 4, wherein the second control means controls the injection means to increase the amount of fuel injected from the injection means in accordance with a decrease of the opening of the throttle valve.

6. The apparatus according to claim 3, wherein the engine includes a throttle valve located in the intake passage for controlling the opening amount of the intake passage, and wherein the throttle valve is substantially fully closed when the engine is idling, wherein the adjusting mechanism includes:

a bypass passage that is connected to the intake passage to bypass the throttle valve;

an idle speed control valve located in the bypass passage for controlling the opening amount of the bypass passage when the engine is idling; and an actuator for actuating the idle speed control valve.

7. The apparatus according to claim 3, wherein the adjusting mechanism includes:

a circulation passage connected to the intake passage for supplying exhaust gas, which has been discharged from the combustion chamber, to the intake passage; and an EGR valve located in the circulation passage for controlling the opening amount of the circulation passage.

8. The apparatus according to claim 1, wherein the second control means starts controlling the injection means when a predetermined time period has elapsed from when the first control means starts controlling the negative pressure producing means.

9. The apparatus according to claim 8, wherein the predetermined time period is determined in accordance with a time lag between the start of the control of the negative pressure producing means by the first control means and a resulting change of the amount of air supplied to the combustion chamber.

10. The apparatus according to claim 8, wherein the predetermined time period is determined in accordance with a time lag between the start of the control of the negative pressure producing means by the first control means and a resulting change of pumping loss in the engine.

11. The apparatus according to claim 1, wherein the engine is able to perform uniform charge combustion, in which the air-fuel mixture is substantially uniform within the combustion chamber, wherein the first control means and the second control means operate only during the stratified charge combustion.

12. An apparatus for controlling fuel injection in an internal combustion engine that is able to perform stratified charge combustion, wherein the air-fuel ratio varies within a combustion chamber during stratified charge combustion, the apparatus comprising:

an injection valve for injecting fuel into the combustion chamber to perform the stratified charge combustion;

an intake passage connected to the combustion chamber for supplying air to the combustion chamber;

an adjusting mechanism for adjusting the flow rate of air supplied to the combustion chamber from the intake passage, wherein the adjusting mechanism causes the pressure in the intake passage to be lowered;

a brake booster operated by pressure applied thereto from the intake passage to increase a braking force;

sensing means for sensing the value of the pressure applied to the brake booster;

first control means for controlling the adjusting mechanism to decrease the flow rate of air supplied to the combustion chamber from the intake passage for lowering the pressure in the intake passage when the value of the pressure sensed by the sensing means is above a predetermined value, which represents a pressure required to properly operate the brake booster, during the stratified charge combustion; and second control means for controlling the injection valve to increase the amount of fuel injected from the injection valve in accordance with the operation of the adjusting mechanism for suppressing a decrease in the engine speed when the adjusting mechanism is controlled by the first control means during the stratified charge combustion.

13. The apparatus according to claim 12, wherein the second control means controls the injection valve to increase the amount of fuel injected from the injection valve in accordance with a lowering of the pressure in the intake passage.

14. The apparatus according to claim 12, wherein the adjusting mechanism includes:

a throttle valve located in the intake passage for controlling the opening amount of the intake passage; and an actuator for actuating the throttle valve.

15. The apparatus according to claim 14, wherein the second control means controls the injection valve to increase the amount of fuel injected from the injection valve in accordance with a decrease of the opening of the throttle valve.

16. The apparatus according to claim 15, wherein the second control means starts controlling the injection valve when a predetermined time period has elapsed from when the first control means starts controlling the adjusting mechanism.

17. The apparatus according to claim 16, wherein the predetermined time period is determined in accordance with a time lag between the start of the control of the adjusting mechanism by the first control means and a resulting change of the amount of air supplied to the combustion chamber.

18. The apparatus according to claim 16, wherein the predetermined time period is determined in accordance with a time lag between the start of the control of the adjusting mechanism by the first control means and a resulting change of pumping loss in the engine.

19. The apparatus according to claim 15, wherein the engine is able to perform uniform charge combustion, in which the air-fuel mixture is substantially uniform within the combustion chamber, wherein the first control means and the second control means operate only during the stratified charge combustion.

* * * * *